(12) United States Patent
Keller et al.

(10) Patent No.: US 11,754,381 B2
(45) Date of Patent: Sep. 12, 2023

(54) SABOT OF THE PUSH-PULL TYPE HAVING MUTUALLY SEPARATE PARTS FOR THE PUSH AND PULL FUNCTION

(71) Applicant: Rheinmetall Waffe Munition GmbH, Suedheide (DE)

(72) Inventors: Ulrich Keller, Unterluess (DE); Michael Gowin, Hermannsburg (DE); Konstantin Arzt, Adelheidshof (DE)

(73) Assignee: RHEINMETALL WAFFE MUNITION GMBH, Suedheide (DE)

( * ) Notice: Subject to any disclaimer, the term of this patent is extended or adjusted under 35 U.S.C. 154(b) by 0 days.

(21) Appl. No.: 17/697,676

(22) Filed: Mar. 17, 2022

(65) Prior Publication Data
US 2022/0205767 A1 Jun. 30, 2022

Related U.S. Application Data

(63) Continuation of application No. PCT/EP2020/074420, filed on Sep. 2, 2020.

(30) Foreign Application Priority Data

Sep. 18, 2019 (DE) ..................... 10 2019 125 128.1

(51) Int. Cl.
F42B 14/06 (2006.01)
(52) U.S. Cl.
CPC ................. *F42B 14/062* (2013.01)
(58) Field of Classification Search
CPC ...... F42B 14/06; F42B 14/061; F42B 14/062; F42B 14/064; F42B 14/065; F42B 14/067; F42B 14/068; F42B 14/08
USPC ................. 102/520, 521, 522, 523
See application file for complete search history.

(56) References Cited

U.S. PATENT DOCUMENTS 3,762,332 A * 10/1973 Witherspoon ........ F42B 14/064
102/523
4,671,182 A 6/1987 Zierler et al.
(Continued)

FOREIGN PATENT DOCUMENTS

DE 3842077 A1 6/1990
DE 3930255 A1 3/1991
(Continued)

OTHER PUBLICATIONS

International Search Report dated Nov. 13, 2020 in corresponding application PCT/EP2020/074420.
(Continued)

*Primary Examiner* — John Cooper
(74) *Attorney, Agent, or Firm* — Muncy, Geissler, Olds & Lowe, P.C.

(57) ABSTRACT

To reduce the mass of a sabot having a pull and a push function, it is proposed that the sabot comprise mutually separate sabot parts, wherein at least one sabot part is configured such that it performs the pull function and at least one sabot part is configured such that it performs the push function. The sabot parts are nested. This can be implemented in the form of cylindrical nesting or in the form of tangential nesting. In the case of the cylindrical nesting, the outer sabot part encloses the inner sabot part along an interface. In the case of the tangential nesting, the sabot parts are divided into sabot subsegments. The latter are nested in alternating fashion in the tangential direction such that a pull-sabot subsegment and a push-sabot subsegment are nested in alternating fashion in the circumferential direction. To provide sufficient sealing, the sabot subsegments overlap one another.

19 Claims, 2 Drawing Sheets

(56) References Cited

U.S. PATENT DOCUMENTS

| | | | |
|---|---|---|---|
| 4,756,255 A | | 7/1988 | Rosenberg et al. |
| 5,027,711 A | * | 7/1991 | Schleicher ............. F42B 14/06 |
| | | | 102/521 |
| 5,204,494 A | | 4/1993 | Meyer et al. |
| 6,085,660 A | * | 7/2000 | Campoli ............... F42B 14/061 |
| | | | 102/521 |
| 6,453,821 B1 | * | 9/2002 | Fowler ................... F42B 14/02 |
| | | | 102/527 |
| 2005/0016413 A1 | | 1/2005 | Eches et al. |
| 2006/0032394 A1 | * | 2/2006 | Eches ................... F42B 14/061 |
| | | | 102/521 |

FOREIGN PATENT DOCUMENTS

| | | |
|---|---|---|
| DE | 4012154 A1 | 10/1991 |
| DE | 3920254 C2 | 1/1992 |
| DE | 3843566 C1 | 4/1995 |
| DE | 102005055503 A1 | 5/2007 |
| DE | 102005055504 A1 | 5/2007 |
| DE | 102008029394 A1 | 12/2009 |
| DE | 102013006498 A1 | 10/2014 |
| EP | 1584887 A1 | 10/2005 |

OTHER PUBLICATIONS

Written Opinion of the International Searching Authority dated Nov. 13, 2020 in corresponding application PCT/EP2020/074420.

* cited by examiner

SABOT OF THE PUSH-PULL TYPE HAVING MUTUALLY SEPARATE PARTS FOR THE PUSH AND PULL FUNCTION

This nonprovisional application is a continuation of International Application No. PCT/EP2020/074420, which was filed on Sep. 2, 2020, and which claims priority to German Patent Application No. 10 2019 125 128.1, which was filed in Germany on Sep. 18, 2019, and which are both herein incorporated by reference.

BACKGROUND OF THE INVENTION

Field of the Invention

The present invention relates to a sabot for subcaliber ammunition or a subcaliber projectile, for example a kinetic energy penetrator. The invention relates in particular to the separation of a push function and a pull function of the sabot with the aim of reducing the mass of the sabot.

Description of the Background Art

Sabots fulfill the task of sealing a, usually ring-shaped, gap remaining between a projectile and an inner wall of a weapon tube in order to be able to effectively exploit the propellant gases of the weapon so as to drive the projectile. Furthermore, a sabot performs the function of the projectile guide in the weapon tube, so that this projectile precisely follows the bore axis of the weapon tube without lateral deflection. In the case of highly subcaliber projectiles, a sabot must also support the projectile during acceleration in the weapon tube, wherein the force introduced into the projectile via the sabot is distributed over a larger area of the projectile length. Otherwise, such a projectile would collapse under the effect of moments of inertia in a punctiform introduction of force.

Detachment in front of the muzzle is made possible by the fact that the sabot is often separated into several segments, which, starting from the tip, detach radially from the projectile as soon as these segments are no longer held together by the inner wall of the barrel in a radial direction. Such segmentation does not have a negative effect on axial force transmission as it runs parallel to the flow of force.

Sabots are known for being kinetic energy penetrators, in which a pressure flange lies fairly in the middle of an elongated, arrow-type flying projectile. The part of the sabot in front of this pressure flange accelerates the projectile by way of pressure, the part of the sabot lying behind it by way of tension. The propellant gas pressure also acts on the tension. The pressure part, i.e., the part in front of the pressure flange, is free from external loads. In practice, such sabots are also referred to as push-pull type sabots.

Furthermore, pure push-type sabots or pure pull-type sabots also exist. In this case, the pressure flange of the sabot is either behind or in front of the actual sabot. In order to obtain the lowest possible sabot mass, both push and/or pull-type sabots are shape-optimized. In addition, high-strength materials are used. As a result, the material is stressed to a high degree, as evenly as possible.

As such, DE 38 43 566 C1, which is incorporated herein by reference, describes a segmented sabot, which is formed as a usual pull-type sabot having only one front guide part and, if necessary, rear guide struts.

DE 39 20 254 C2, which is incorporated herein by reference, designates a two-flange sabot (push-pull-type sabot) having a front caliber-sized guide flange and rear caliber-sized pressure flange as belonging to the state of the art.

DE 39 30 255 C2, which is incorporated herein by reference, relates to a kinetic energy penetrator arrangement having a two-flange sabot (push-pull-type sabot) or having a pull-type sabot.

A segmented two-flange sabot is disclosed in DE 10 2005 055 503 A1, which is incorporated herein by reference. The sabot comprises a positive, shell-shaped middle sabot part in the direction of the longitudinal axis of the projectile. In order to achieve in a simple way that the sabot has a lower mass than comparable sabots with the same flexural strength, it is proposed to connect the two flanges of the sabot, in addition to the middle sabot part, by lateral struts. At least one strut is assigned to each sabot segment.

A segmented sabot having predetermined breaking points is described in DE 10 2005 055 504 A1, which is incorporated herein by reference. The sabot has a front guide flange and a rear pressure flange. The predetermined breaking point results in a perforated threaded area. After screwing the penetrator into the sabot, these axial predetermined breaking points or separation joints are closed by vulcanization with a vulcanizate. The detachment behavior of the sabot segments is mainly determined by the properties of the vulcanizate in the case of firing.

A sabot projectile is also published in DE 10 2008 029 394 A1, which is incorporated herein by reference. The guide cage is made of plastic. To ensure rigid radial guidance of the projectile body, the guide cage can be formed of a fiber-reinforced plastic and a support wall of a metal, preferably of an aluminum alloy. Both parts are positively or non-positively connected to each other.

From DE 10 2013 006 498 A1, which is incorporated herein by reference, a sabot projectile is known, which is characterized by the fact that a narrow segmented steel disc is used as a guide element, which, on the side facing the guide cage, is positively or non-positively connected to a segmented, hollow-cylindrical covering part made of plastic.

The space under the pressure flange of a push-pull-type sabot is hard to optimize in its shape as this area is difficult to reach with recesses in terms of manufacturing technology. A casting solution is not possible because the associated mechanical properties are worse than those of a corresponding wrought alloy. The push part of the sabot itself is not very efficient. Because this sabot is made of considerably more flexible material than the projectile for reasons of mass, it must have a large transverse section as compensation in order to be able to support the projectile effectively at all. This solution is contrary to the mass optimization of the sabot.

SUMMARY OF THE INVENTION

It is therefore an object of the present invention to provide a possibility for minimizing the mass of a sabot.

The invention is based on the idea of designing a sabot in such a way that it has on the one hand a push function and on the other hand a pull function, wherein these functions act or occur independently of each other. As a result of this design, the push function and the pull function on the sabot are separated. For the separation of the functions into sabot parts, the sabot is mechanically divided or separated such that at least one sabot part performs the pull function and at least one other sabot part performs the push function. The sabot parts are in turn connected to a projectile by means of a positive connection. In contrast, there is no positive connection between the sabot parts.

For this purpose, the first version of the sabot formed of two nested sabot parts, an inner sabot part and an outer sabot part. The outer sabot part encloses the inner sabot part. Thereby, the sabot parts form an interface. The interface of the two sabot parts should preferably be chosen to be cylindrical so that it can be manufactured relatively easily. This results in a cylindrical nesting of the sabot parts.

The sabot parts can in turn be segmented. A tangential segmentation of the sabot parts for the detachment of the sabot segments from the projectile or penetrator remains unaffected by this preferably cylindrical nesting.

An advantage is that no axial forces are transmitted via the interface, so that no high demands are placed on the axial positioning of the sabot parts. A radial gap between the inner and outer sabot part is preferably chosen to be small. This avoids leaks. Alternatively, an additional seal against high propellant gas pressure can also be provided.

The inner sabot part performs the pull function, the outer sabot part performs the push function of the sabot. The sabot parts have independent surfaces on which the propellant gases act. The surface of the push-sabot part should be kept small. Preferably, these form a seamless common surface of the sabot, on which the propellant gases can act. This surface should be designed in such a way that it is based on a (centrally) cut off (single-shell) hyperboloid. Alternative forms are also possible.

There is no exchange of forces between the two sabot parts, with the exception of slight friction forces. As a result, the load-bearing capacity of both sabot parts can be fully exploited independently of each other. The choice of pitch diameter determines the load distribution between the two sabot parts. This pitch diameter corresponds to the outer diameter of the inner sabot part or the inner diameter of the outer sabot part.

In a further embodiment, a tangential nesting of the sabot parts is preferred. The combinable push-pull sabot can typically be subdivided into three segments of 120° each, which allow for detachment from the projectile after passage through the muzzle.

A push-sabot subsegment and a pull-sabot subsegment can be nested in alternating fashion in the tangential direction. A meaningful number or quantity is, e.g., three sabot subsegments. However, other numbers of sabot subsegments are also possible.

Each sabot part or sabot subsegment has its own surface on which the propellant gases act, resulting in the driving force to be transmitted to the projectile. In the push-type sabot or the push-sabot subsegments, these surfaces are straight, and preferably smooth. The surface of the pull-part-sabot or the pull-sabot subsegments can be compared with a (centrally) cut off (single-shell) hyperboloid. However, alternative forms are also possible.

With the exception of low friction forces, there is also no balance of forces between the sabot parts or sabot subsegments. As a result, the load-bearing capacity of each sabot part can also be fully exploited in this version. The choice of the respective segment angles determines the load distribution between the two function groups (sum of the pull-sabot and sum of the push-sabot subsegments). In principle, the interface does not differ from previously necessary divisions. However, the number of divisions increases. The surfaces in contact are smaller because the sabot parts or sabot subsegments overlap only slightly. This overlap area is necessary for sealing.

Production and the possibility of shape optimization are now easier and better because of the division of the sabot into a pull function and a push function. Production is simplified due to, e.g., shorter components of the sabot or the sabot parts or the sabot subsegments. High demands in terms of accuracy are only placed on the, preferably cylindrical, fit or interface between the two sabot parts. The use of different materials for the sabot part having the pull function and the sabot part having the push function is simplified. These materials can be selected with regard to their mechanical properties, in each case in accordance with the different demands (pull function, push function) placed on the respective sabot part.

Due to the fact that the efficiency of the push-sabot part, which functions or acts independently of the pull-sabot part, is increased, the (entire) sabot in both versions can be designed more easily than previous solutions. The potential for reduction in mass is therefore very high. This results in particular from the fact that only two "half" sabots are used, and these are nested into each other or in alternating fashion in the circumferential direction.

As with known sabots, pockets may be incorporated in the push parts of the sabot.

This creates a combinable push-pull-type sabot that can be produced in a simple way, which is designed according to its prioritized task or requirements, and which can also be made lighter.

To reduce the mass of a sabot having a pull and a push function, it is proposed that the sabot comprise mutually separate sabot parts, wherein at least one sabot part is configured in such a way that it performs the pull function, and wherein at least one sabot part is configured in such a way that it performs the push function. For this purpose, the sabot parts are nested. This can be implemented in the form of cylindrical nesting or in the form of tangential nesting. In the case of the cylindrical nesting, the outer sabot part encloses the inner sabot part along an interface. In the case of the tangential nesting, the sabot parts are divided into sabot subsegments. The latter are nested in alternating fashion in the tangential direction, with the result that a pull-sabot subsegment and a push-sabot subsegment are always nested in alternating fashion in the circumferential direction. To provide sufficient sealing, the sabot parts or sabot subsegments overlap one another.

A combination of cylindrical and tangential nesting is also possible.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
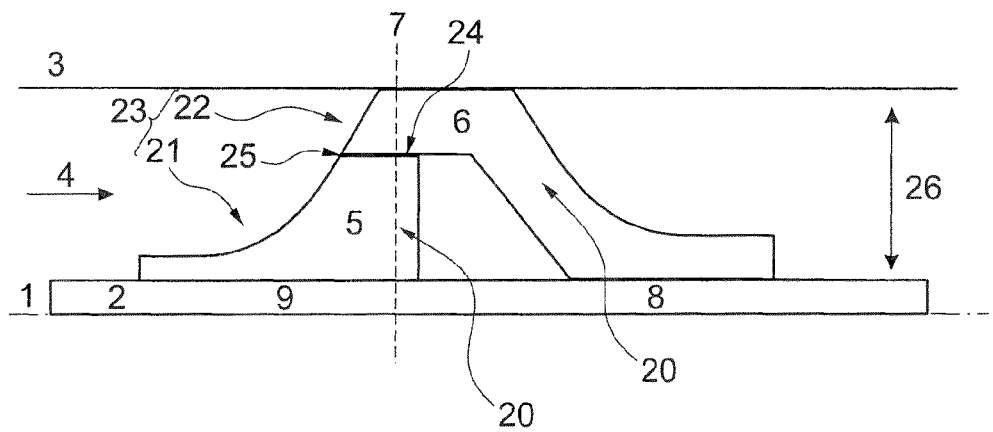
FIG. 1 is a half-sectional representation of projectile, sabot parts and weapon tube in an exemplary embodiment.
Figure 2:
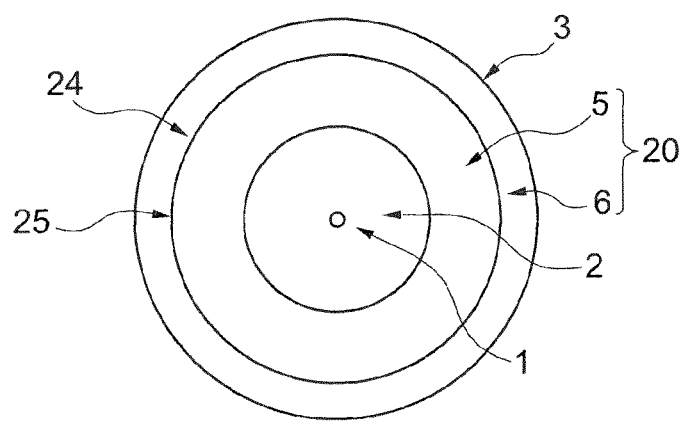
FIG. 2 is a representation of the sabot and the projectile in the weapon tube in cross-section according to FIG. 1.

FIG. 1 shows the invention axially symmetrically and sketch-like. An axis of rotation is marked with 1. A subcaliber projectile 2 has a much smaller diameter than the inner diameter of the weapon tube 3 (FIG. 2). The remaining space 26 between the projectile 2 and the weapon tube 3 is filled by a sabot 20.

The sabot 20 includes sabot parts 5, 6, at least two. The sabot parts 5, 6 are not one-piece but mutually separated. They are nested within each other. The partial sabot part 5 forms an inner sabot and the partial sabot part 6 an outer sabot. Here, the inner sabot 5 performs the pull function and the outer sabot 6 the push function of the (entire) sabot 20. Due to this design structure, the sabot parts 5, 6 can be, for example, made of different materials.

An interface 24 of the two sabot parts 5, 6 is preferably cylindrical. A radial gap 25 in the area of the interface 24 between the inner 5 and the outer sabot part 6 is preferably chosen to be small.

The sabot parts 5, 6 have mutually independent (separate) surfaces 21, 22, on which the propellant gases act and from which the driving force to be transmitted to the projectile 2 results. The surfaces 21, 22 preferably merge into each other in such a way that a common, preferably smooth, surface 23 of the sabot 20 is formed. The surfaces 21, 22 of the sabot subsegments 5, 6 form a (centrally) cut off (single-shell) hyperboloid. However, alternative forms are also possible.

There is no exchange of forces between the two sabot parts 5, 6, with the exception of low friction forces. As a result, the load capacity of both sabot parts 5, 6 can be fully exploited independent of each other.

Between the two sabot parts 5, 6 and the projectile 2 there is in each case a positive connection 8, 9, but is possible in the form of a thread, as often applied in practice. On the other hand, there is no positive connection between the sabot parts 5 and 6, i.e., there is no form fit between the sabot parts 5, 6.

By means of a propellant pressure 4 acting behind the projectile 2, the projectile 2 is accelerated in a known manner in the direction of fire, in the representation according to FIG. 1 to the right. The projecting surface is decisive for the axial forces acting on the projectile parts 2, 5, 6. In the selected cutting plane 7, these surfaces correspond to the cutting surfaces. The subcaliber projectile 2 (FIG. 2) is driven to a small extent by the gas pressure itself. In addition, the projectile 2 is driven out of the weapon tube 3 via the inner sabot 5 as well as the outer sabot 6, on which the propellant pressure 4 also acts.

Figure 3:
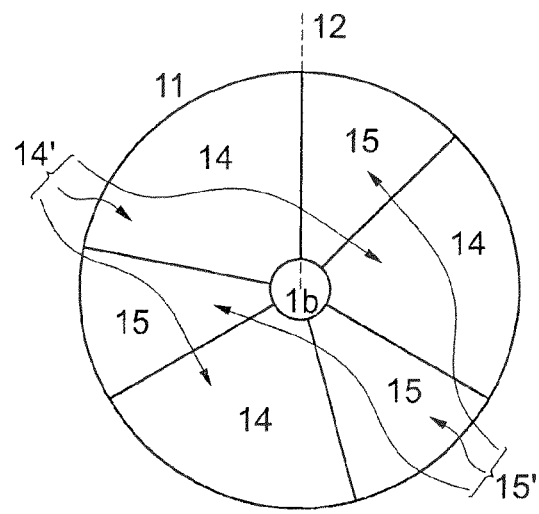
FIG. 3 is a representation of a projectile, a sabot and weapon tube in an exemplary embodiment.

A further embodiment is shown in FIG. 3. The illustration shows a subcaliber projectile 10 having a sabot 30, as seen from behind in the direction of firing. This sabot 30 comprises at least one sabot part 14' having a pull function and at least one sabot part 15' having a push function.

In a preferred embodiment, these sabot parts 14', 15' in turn are composed of several sabot subsegments 14, 15. The sabot subsegments 14, 15 are located in the space between the projectile 10 and the weapon tube 11. The sabot subsegments 14 perform the pull function and the sabot subsegments 15 perform the push function of the sabot 30.

Preferably, a push-sabot segment and a pull-sabot segment 14, 15 are nested in alternating fashion in the tangential direction, so that a pull-sabot subsegment 14 always follows a push-sabot subsegment 15 in alternating fashion in the circumferential direction.

The number and segment widths of the pull-sabot subsegments 14 and the push-sabot subsegments 15 are freely selectable. The selection of the respective segment angles determines the load distribution between the two function groups (sum of the pull-sabot subsegments 14 or sum of the push-sabot subsegments 15). As a result, the (entire) sabot 31 formed by the sabot subsegments 14, 15 can be individually adapted to the tasks or demands placed on it.

In the preferred version, three sabot subsegments 14, 15 of 120° each are provided. In total, the sabot 30 thus comprises three pull-sabot subsegments 14 and three push-sabot subsegments 15.

Figure 4:
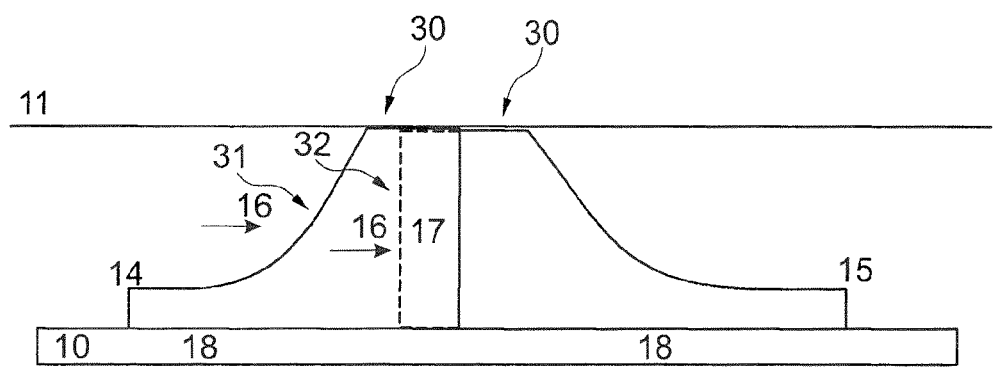
FIG. 4 is a sectional representation from FIG. 3.

FIG. 4 is a sectional representation along a marked line 12 (FIG. 3). Shown are the weapon tube 11, the projectile 10 as well as a pull-sabot subsegment 14 and a push-sabot subsegment 15 according to the line 12.

Between the two sabot subsegments 14, 15 and the projectile 10 there is a positive connection 18, for example via a thread. For a sufficient sealing of the sabot subsegments 14, 15 an overlap 17 of the sabot subsegments 14, 15 is necessary. This overlap 17 should be large enough for the sealing to be guaranteed.

Each sabot subsegment 14, 15 has its own surface 31, 32, on which the propellant gases 16 act, resulting in the driving force to be transmitted to the projectile 10. The propellant pressure 16 acts on the left side of the respective sabot parts 14', 15', whereby the projectile 2 in this representation is accelerated to the right. The propellant pressure 16 acts on the surface 31 of the sabot subsegments 14 and on the surface 32 of the sabot subsegments 15.

In the push-sabot subsegments 15, these surfaces 32 are straight and preferably smooth. The surfaces 31 of the pull-sabot subsegments 14 can be compared with a (centrally) cut off (single-shell) hyperboloid. However, alternative forms are also possible.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A sabot comprising:
mutually separate sabot parts including at least a first sabot part having a surface upon which propellant gases act and at least a second sabot part having a surface upon which the propellant gases act, each of the first and second sabot parts being positively connected to a projectile to accelerate the projectile when acted upon by the propellant gases,
wherein the first sabot part and the second sabot part are positioned on the projectile such that the propellant gases first act on the surface of the first sabot part, such that the first sabot part performs a pull function by causing tension to accelerate the projectile and the second sabot part performs a push function by causing pressure to accelerate the projectile.

2. The sabot according to claim 1, wherein the sabot parts are nested.

3. The sabot according to claim 2, wherein the sabot parts are nested by a cylindrical interface.

4. The sabot according to claim 1, wherein the first sabot part having the pull function forms an inner sabot and the second sabot part having the push function forms an outer sabot.

5. The sabot according to claim 1, wherein the sabot parts have mutually separated surfaces on which propellant gases can act.

6. The sabot according to claim 5, wherein the surfaces merge with each other to form a common surface of the sabot.

7. The sabot according to claim 1, wherein each of the sabot parts include sabot subsegments.

8. The sabot according to claim 7, wherein a push-sabot subsegment and a pull-sabot subsegment are nested in alternating fashion in the tangential direction.

9. The sabot according to claim 7, wherein, three of the sabot subsegments have a pull function and three of the sabot subsegments have a push function.

10. The sabot according to claim 7, wherein each of the sabot subsegments has a respective surface on which propellant gases act.

11. The sabot according to claim 1, wherein there is no positive connection between the sabot parts.

12. The sabot according to claim 1, wherein with respect to a radial direction of the sabot, there is a radial gap between the first sabot part and the second sabot part, such that there is no positive connection between the first sabot part and the second sabot part.

13. The sabot according to claim 1, wherein a majority of the first sabot part is positioned on the projectile closer to a rear end of the projectile and a majority of the second sabot part is positioned on the projectile closer to a forward end of the projectile.

14. The sabot according to claim 1, wherein a portion of the surface of the first sabot part is curved and the surface of the second sabot part is linear.

15. A projectile comprising:
a sabot,
the sabot comprising:
    mutually separate sabot parts including at least a first sabot part having a surface upon which propellant gases act and at least a second sabot part having a surface upon which the propellant gases act, each of the first and second sabot parts being positively connected to the projectile to accelerate the projectile when acted upon by the propellant gases,
    wherein the first sabot part and the second sabot part are positioned on the projectile such that the propellant gases first act on the surface of the first sabot part, such that the first sabot part performs a pull function by causing tension to accelerate the projectile and the second sabot part performs a push function by causing pressure to accelerate the projectile.

16. Ammunition comprising the projectile according to claim 15.

17. The projectile according to claim 15, wherein with respect to a radial direction of the sabot, there is a radial gap between the first sabot part and the second sabot part, such that there is no positive connection between the first sabot part and the second sabot part.

18. The projectile according to claim 15, wherein a majority of the first sabot part is positioned on the projectile closer to a rear end of the projectile and a majority of the second sabot part is positioned on the projectile closer to a forward end of the projectile.

19. The projectile according to claim 15, wherein a portion of the surface of the first sabot part is curved and the surface of the second sabot part is linear.

\* \* \* \* \*